United States Patent [19]

Hong

[11] Patent Number: 5,223,934
[45] Date of Patent: Jun. 29, 1993

[54] PARTIAL MAGNIFICATION RECORDING METHOD AND APPARATUS THEREOF

[75] Inventor: Kuen P. Hong, Suweon, Rep. of Korea

[73] Assignee: SamSung Electronics Co., Ltd., Suwon, Rep. of Korea

[21] Appl. No.: 730,007

[22] Filed: Jul. 15, 1991

[30] Foreign Application Priority Data

Jan. 9, 1991 [KR] Rep. of Korea ............... 91-223

[51] Int. Cl.⁵ .................................. H04N 5/30
[52] U.S. Cl. ......................... 358/209; 358/224
[58] Field of Search ........... 358/140, 180, 225, 209, 358/224, 451, 213.27, 213.26, 227; 354/731, 709; 340/731

[56] References Cited

U.S. PATENT DOCUMENTS

| | | | |
|---|---|---|---|
| 4,746,982 | 5/1988 | Nadan et al. | 358/160 |
| 4,876,601 | 10/1989 | Hashimoto et al. | 358/213.26 |
| 4,910,599 | 3/1990 | Hashimoto | 358/213.26 |
| 4,963,981 | 10/1990 | Todaka et al. | 358/213.13 |
| 5,019,912 | 5/1991 | Matsuda | 358/213.26 |
| 5,029,006 | 7/1991 | Katsumata et al. | 358/180 |
| 5,043,802 | 8/1991 | Tarumizu et al. | 358/36 |
| 5,043,817 | 8/1991 | Kinugasa et al. | 358/213.13 |

Primary Examiner—Michael T. Razavi
Assistant Examiner—Tuan V. Ho
Attorney, Agent, or Firm—Robert E. Bushnell

[57] ABSTRACT

Video camera (camcorder) having the partial magnification recording function for a predetermined object, which can be later reproduced after recording a magnified image on a video tape and to RAM, comprising the division signal generating process A1 to divide the image plane of the view-finder into sectors according to the first control signal when picture is appeared on the image plane of the view-finer, the cursor signal generating process A2 to generate cursor signal that probes a predetermined object according to the second control signal when a predetermined object is positioned in the divided image plane, and the magnified signal storage means A3 to convert the analog signal into the digital signal during the picture recording of the magnified signal and to store the digital signal in the memory device for reproduction. According to the present invention, the camcorder provided with the magnifying and picture recording function not only performs partial magnification recording the predetermined object on video tape, but also provides the efficient surveillance system by storing the record in the memory device and reproducing later in the still form.

24 Claims, 2 Drawing Sheets

PARTIAL MAGNIFICATION RECORDING METHOD AND APPARATUS THEREOF

BACKGROUND OF THE INVENTION

This invention relates to a video camera (hereinafter "camcorder"), and more specifically to, the magnifying method and apparatus for picture recording of predetermined object, in which a certain object can be magnified and recorded onto a video tape and/or RAM out of images appearing through a view-finder and also can be reproduced if it is desired.

When a motion picture is taken by a camcorder, focusing on a predetermined object also, many other objects around the predetermined object appear and therefore these unnecessary objects are recorded together with the predetermined object. In order to solve this problem, conventional camcorders have a zoom function to magnify the image of the predetermined object. However, when the picture is taken at somewhat remote distance, the zoom has functional limitations in that the predetermined object which is recorded or reproduced is difficult to distinguish from those unnecessary objects.

SUMMARY OF THE INVENTION

This invention is concerned with solving the aforementioned problem. An object of the invention is to provide a partial magnification recording method and apparatus, in which only the predetermined object appearing through the view-finder during the motion picture taking is magnified and recorded onto video tape and/or recorded in memory and also reproduced later if desired.

In order to achieve the above object, there is provided a partial magnification recording method for a predetermined part of an image, in which color signals and bright signals obtained by picture taking of the subject are processed and displayed on a view-finder, comprising: normal picture recording process which is carried when a picture recording key is pressed; division signal generating process for dividing an image plane of said view-finder into a predetermined area when said subject is picture taken; cursor signal generating process for determining if a cursor is identified with the predetermined part of the subject by generating a cursor signal with the same size as that of the predetermined part on said image plane of said view-finder and moving said cursor signal to an appropriate direction; and magnified signal storing process for reproducing a video signal of said predetermined part in such a manner that said predetermined part is magnified in a predetermined rate and recorded on a video tape when said cursor is identified with said predetermined part and said video signal of said predetermined part recorded on the tape is converted into a digital signal for reproduction.

According to the invention, there is also provided an apparatus for partial magnification recording of a predetermined part from a subject, which includes a picture pick-up means converting incident rays entering through a lens into electrical signals, a matrix means generating a bright signal and a color difference signal from the electrical signals, an encoder means modulating said bright and color difference signals in two-phase, a video signal process means for processing and providing the modulated signals to a view-finder and a picture recording means, and a lens operating means for focusing the lens, the improvement comprising: division signal generating means for generating a division signal to divide an image plane of the view-finder into a grid in response to a first control signal; cursor signal generating means for generating a cursor signal for selecting a predetermined part of the grid according to a second control signal; mixing means for mixing said division signal with said cursor signal and a video signal; magnifying clock generating means for providing a clock signal to said picture pick-up means for the purpose of magnifying the predetermined part according to a third control signal when the is positioned within said cursor signal; switch means for providing the video signal magnified in said video process means to the view-finder and recording means according to a fourth control signal when the magnifying clock signal is inputted; magnified signal storage means for converting the magnified signal into a digital signal during its recording and storing the digital signal in the memory in order to reproduce; and microcomputer for controlling all means according to the first through the fourth control signals.

BRIEF DESCRIPTION OF THE DRAWINGS

These and other objects, and advantages of the present invention will become apparent from the following description for the preferred embodiments taken in conjunction with the accompanying drawings, in which.

DETAILED DESCRIPTION OF THE INVENTION

The present invention will be now described in more detail with reference to the attached drawings.

Figure 1:
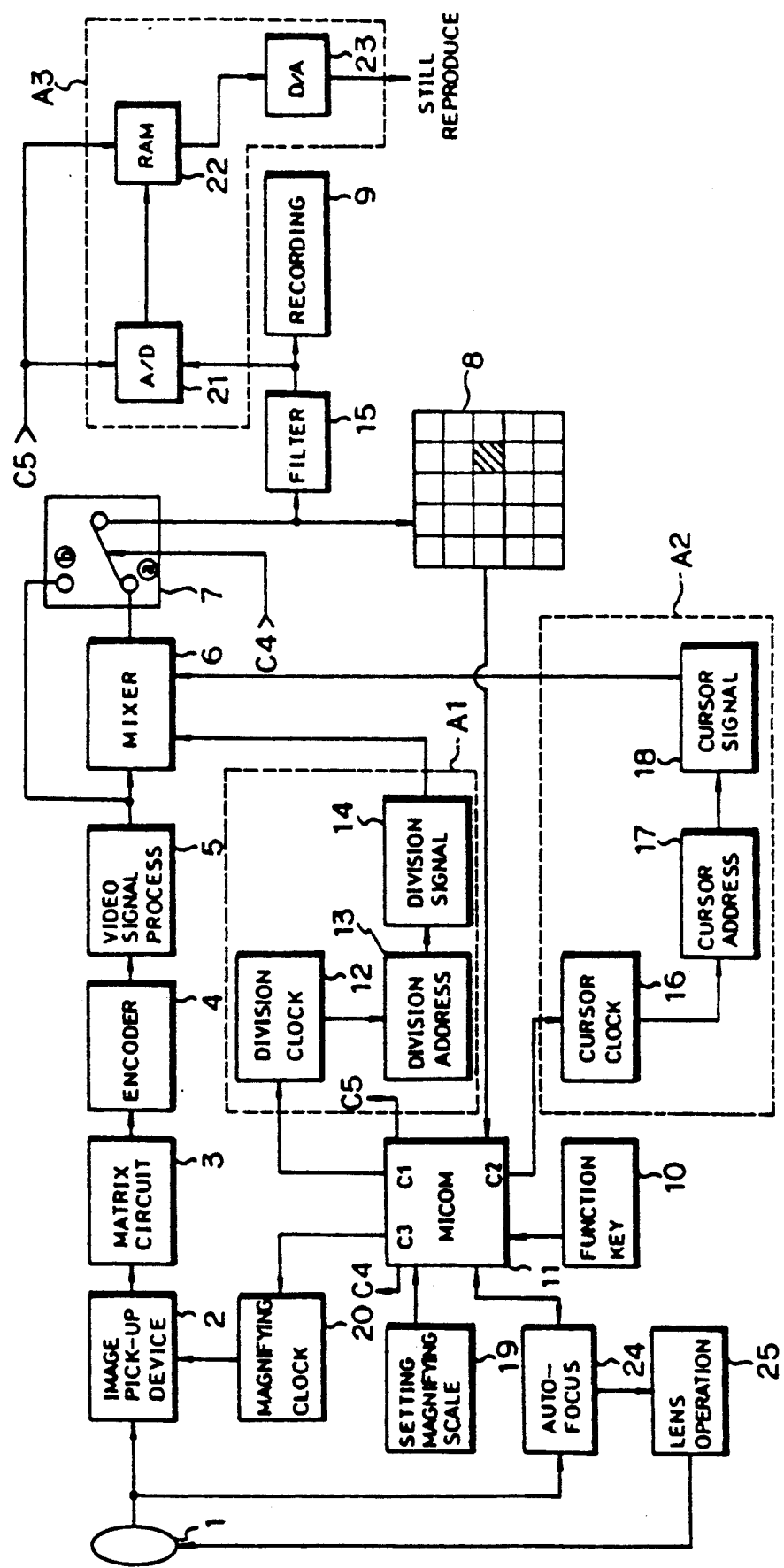
FIG. 1 is a block diagram of a camcorder having an enlargement recording function of a predetermined part of an object in accordance with the present invention.

FIG. 1 is a block diagram of a partial magnification recording apparatus (camcorder) for a predetermined object in accordance with the invention. In FIG. 1, incident rays entering through lens 1 are converted into electrical signals by an image pick-up means 2, which is connected to an input terminal of a matrix circuit 3 for generating luminance signals and color difference signals. An output terminal of the matrix circuit 3 is connected to an input terminal of an encoder 4 which changes the luminance signals and color difference signals into two-phase flow. The output terminal of the encoder 4 is connected to a video signal processor 5.

Further, a microcomputer 11 which is connected to a keypad 10 generates a first control signal C1 to apply to a division signal generating means A1 so that an image plane of a view-finder is divided into a predetermined area. On the other hand, the microcomputer 11 generates a second control signal C2 to apply to a cursor signal generating means A2 so as to probe the predetermined object when the predetermined object is positioned in the divided area.

Subsequently, the microcomputer 11 generates a third control signal C3 to apply to a magnifying clock generator 20 so as to magnify the predetermined object when it is located within the cursor, where an output terminal of the magnifying clock generator 20 is connected to the image pick-up means 2.

Finally, the microcomputer 11 generates a fourth control signal C4 to apply to a contact point (a) or (b) of a switching means 7 in response to whether it is a normal recording mode or a magnifying recording mode so as to connect a magnifying signal storage means A3 to the microcomputer 11 in case of the magnifying recording.

Furthermore, a magnifying scale setting means 19 is connected to the microcomputer 11 through an input signal for setting a magnifying scale, and an auto-focus circuit 24 is connected between the lens 1 and the microcomputer 11 so as to focus on the object through a lens operating circuit 25.

To describe in more detail, the division signal generator A1 comprises a division clock generator 12 for generating a division clock signal according to the input of the first control signal C1 which is generated from the microcomputer 11, a division address generator 13 for generating a view-finder division address signal according to the input of the division clock signal, and a division signal generator 14 for generating a division signal to a mixer 6 in order to divide a view-finder 8 according to the input of the view-finder division address signal.

The cursor signal generator means A2 comprises a cursor clock generator 16 for generating a cursor clock according to the second control signal C2, a cursor address generator 17 for generating a cursor address according to the input of the cursor clock, a cursor signal generator 18 for generating a cursor signal to the mixer 6 according to the input of the address signal for probing a sector in the grid of the view-finder 8.

Furthermore, the magnifying signal storage means A3 comprises an analog to digital converter 21 for converting a video signal, which is magnified by a predetermined scale, into a digital signal, a memory device 22 for memorizing and providing such a digital data signal, and a digital to analog converter 23 for converting such an output digital signal from the memory device into an analog signal to regenerate in a still form.

The division signal generator A1, the cursor signal generator A2, and the video signal processor 5 are commonly connected to the mixer 6 so as to apply their division signal, cursor signal and video processing signal to the mixer 6, respectively. An output terminal of this mixer 6 is connected to the switch means 7, so that the switch means 7 is connected to the view-finder 8 and a picture recording circuit 9 through a filter 15 simultaneously according to the presence or absence of the recording signal.

Figure 2:
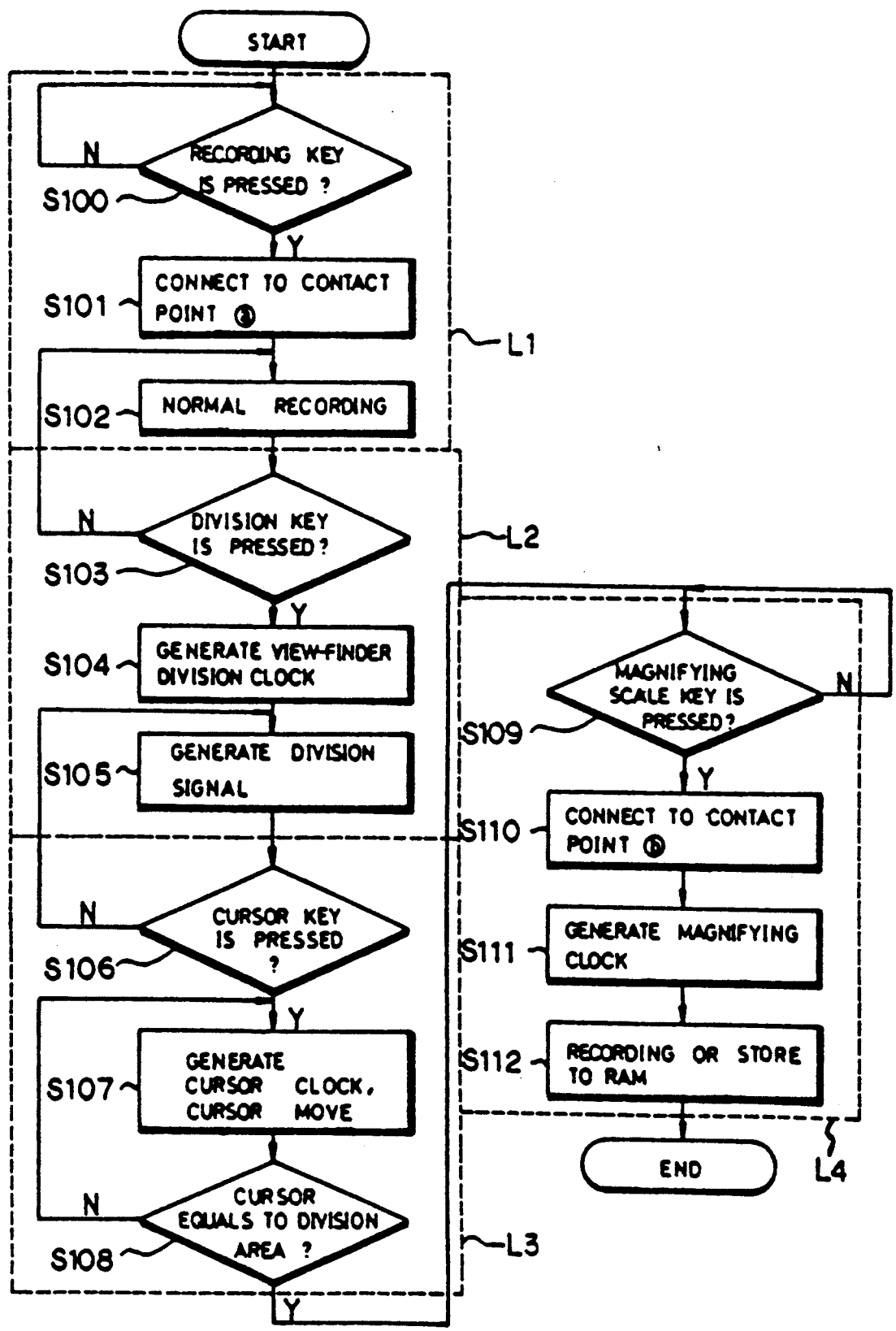
FIG. 2 is a flow-chart showing the sequential performance of the present invention.

FIG. 2 is a flow-chart showing the sequential performance of the invention. The partial magnification recording method comprises a normal recording routine L1 for carrying out normal recording in response to an input of a recording key, a division signal generating routine L2 for generating division signal when a division key is pressed, a cursor signal generating routine L3 to determine if a divided image plane is identified with the predetermined part or not, and a magnifying signal storage routine L4 for magnifying, recording, and reproducing the predetermined part when the cursor is identified with the predetermined part.

To describe in more detail, the normal recording routine L1 comprises the steps of determining if a recording key is pressed (S100), selecting contact point (a) of the switching means 7 when the recording key is pressed down (S101), and carrying out the normal recording (S102). And, the division signal generating routine L2 comprises the steps of determining if a division key is pressed (S103), generating a view-finder division clock when the division key is pressed (S104), and generating vertical and horizontal division lines for the view-finder (S105), where if the division key is not pressed down, it returns to the step (S102) automatically.

Also, the cursor signal generating routine L3 comprises the steps of determining if a cursor key is pressed (S106), generating a cursor clock probing the predetermined part when the cursor key is pressed (S107), and determining if the cursor is identified with the predetermined part to magnify in the subject. If the cursor key is not pressed, it returns to the step (S105). And, if the cursor is identified with the predetermined part, the magnifying signal storage routine L4 is out and after which it returns to the step S107.

The magnifying signal storage routine L4 comprises the steps of determining if a magnifying scale key is pressed when the cursor is in accordance with the predetermined part of the subject to magnify (S109), selecting the contact point (b) of the switching means 7 when the magnifying scale key is pressed (S110), generating a magnifying clock signal (S111), and recording the generated signal onto a video tape and memory device through the image pick-up device 2 and the video processor 5. When the magnifying scale key is not pressed, it returns to the step S108.

Now, the invention will be described in more detail with reference to FIG. 1.

The incident rays entered through the lens 1 are converted into red, green and blue signals ER, EG, and EB according to the image pick-up device. The signals ER, EG and EB are inputted into the matrix circuit 3 through an amplifier (not shown) and further transformed into a bright signal Ey and color difference signals ER—EY and EB—EY respectively in order to input to the encoder 4.

The bright signal EY is added to a sychronizing signal and the color difference signals ER—EY and EB—EY are provided to a modulator to be modulated by two-phase, where the modulator is provided with chrominance subcarrier frequency of 3.58 MHZ. The color difference signals thus modulated are mutually added to generate chroma signals. Such chroma signals are inputted to an adder through the amplifier and then added with color burst signals, so as to generate color signals EC. Consequently, the bright signal EY and color signal EC are input to the video signal processor 5 as a video signal of NTSC method.

The video signal processor 5 processes the input video signal and applies it to the contact point (a) of the switching means 7 through the mixer 6. In that case, the switching means 7 is located at the contact point (a) by the fourth control signal C4 of the microcomputer 11, so the video signal of the subject passed through the switching means 7 appears on the view-finder 8 and also recorded by the picture recording circuit 9.

When a picture taker takes picture of the object appearing in the view-finder 8 and wishes to magnify a predetermined part (for example, the black part), the picture taker presses the division function key among several keys on the function key input device 10. Then the microcomputer 11 recognize this, and provides the first control signal C2 to the division clock generator 12. Then, the division clock generator 12 generates the division clock for the picture plane of the view-finder 8 and provides it to the division address generator 13.

At the division address generator 13, an address signal is generated and provided to the division signal generator 14. Then the division signal is applied to the mixer 6 and the view-finder division signal is applied to the view-finder 8 together with the video signal, which is passed through the mixer 6, since the switch 7 is continuously located at the contact point (a).

At this time, the vertical and horizontal division lines appear on the view-finder 8, as shown in FIG. 1. These video signals and the division lines are disadvantageously transmitted to the picture recording circuit 9. In order to solve the problem, the filter 15 eliminates the division signal and passes only the video signal only that the predetermined part is recorded on the video tape.

Also, if the picture taker seeing the view-finder 8 provided with the thin vertical and horizontal lines, desires to magnify the black part as shown in FIG. 1, the picture taker presses down the function key of the cursor signal generator on the function key input device 10. Thus, the microcomputer 11 generates the second control signal C2 and provides it to the cursor clock generator 16. And, when the cursor clock generator 16 generates the cursor clock signal and provides it to the cursor address generator 17, the cursor address generator 17 provides the address for generating the cursor signal to the cursor signal generator 18 to be applied to the mixer 6.

Thus, the cursor signal mixed with the video signal and image plane division signal in the mixer 6 is indicated on the view-finder 8 via the switch 7. In this process, the filter 15 passes only the video signal and eliminates the vertical and horizontal division lines and the cursor signal so as to record only the genuine video signal on the video tape.

The cursor signal passed through the switch 7 displayed in the form of  on the right upper portion of the view-finder 8, and the cursor is freely movable around by pressing cursor moving keys on the function key input device 10. If this cursor coincides with the black part on the view-finder 8 as shown in the FIG. 1, the microcomputer 11 recognizes the situation and generates the third control signal C3.

Therefore, the microcomputer 11 generates the third control signal C3 when the black part is in accordance with the cursor and the magnifying clock generator 20 generates the magnifying clock signal. This magnifying clock signal is applied to the image pick-up device 2, in which the magnifying clock signal is synchronized with the horizontal synchronizing signal per a field, and the magnified video signal is applied to the contact point (b) of the switching means 7.

At the same time, the microcomputer 11 makes the fourth control signal C4 to a high level and locates the switch means 7 at the contact point (b). Therefore, the magnified video signal is indicated on the view-finder 8 through the contact point (b) of the switching means 7 and provided to the picture recording circuit 9 via the filter 15 so as to be recorded on the video tape by being.

In this case, since the switching means 7 is positioned at the contact point (b), the division signal and the cursor signal do not appear on the view-finder 8. Also, the signal magnified through the above process is converted to a digital signal at the analog to digital converter 21, which is operated according to a control signal C5 of the microcomputer 11, and stored at the memory device 22 so as to be reproduced later in the still form via the digital to analog converter 23.

Furthermore, the auto-focus circuit 24 and the lens operating circuit 25 as shown in FIG. 1 accomplish automatically the focussing of the focal point in the picture taking.

As described above, the camcorder provided with the partial magnification recording function can perform the magnification recording of the predetermined part of the subject on the video tape, and provide an efficient surveillance system since the record can be stored in the memory device and reproduced later in the from of still for viewing.

FIG. 2 is a flow-chart showing the sequential performance of the invention.

Firstly, when the operator presses down the picture recording key on the function key device 10 (S100), the microcomputer 11 recognizes the operation and proceeds from steps (S101) to the step (S102), the microcomputer 11 locates the switching means 7 at the contact point (a) (S101) and performs the step (S102) of normal recording.

In the normal recording, if the division key is pressed down to divide the image plane of the view-finder 8 vertically and horizontally at the step (S103), the microcomputer 11 generate the first control signal C1 for generating the division clock (S104). However, if the division key is not pressed down, the program returns from the step (S103) to the step (S102) so as to continue performing the normal recording.

When the view-finder division clock is generated, the vertical and horizontal division lines appear on the view-finder 8 (S106). At the same time, if the operator presses the cursor key for probing the predetermined part, the program proceeds from the step (S106) to the step (S107) for generating the cursor clock. However, if the cursor key is not pressed down, only the view-finder image-plane division signal appear on the view-finder 8.

On the other hand, the operator presses the cursor key, a cursor clock signal appears at if the left upper corner of the view-finder 8 in the form of  and the operator can move the cursor to pursue the predetermined part by operating the cursor moving keys, which has been publicly known for their right, left, upper, and lower moving functions. Therefore, when the predetermined part is in accordance with the divided image plane to magnify, then the operator presses down the magnifying key (S108).

When this magnifying key is pressed (S109), the microcomputer 11 locates the switching means 7 to contact point (b) (S110) and provides the third control signal C3 to the magnifying clock generator 20 for generating the magnifying clock (S111). The magnifying clock signal thus generated is applied to the image pick-up device so that the magnifying signal is generated for the predetermined part at the video processor 5 and recorded on the video tape and the memory device (S112).

According to the present invention described as above, the partial magnification recording apparatus can magnify and record a predetermined part by the camcorder. Furthermore, such magnified and recorded part can be stored and reproduced if desired. Therefore, this invention has many advantageous features to be efficiently utilized in many roles including as a surveillance camera installed in banks, etc.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A method for magnifying a part of an image on a video display, said method comprising:
    performing normal picture recording when a picture recording key is pressed;
    determining if a division key is selected and when said division key is selected dividing an image plane of said image into sectors by generating a division signal to vertically and horizontally divide said view-finder;
    generating a view-finder clock when said division key is pressed;
    generating a cursor signal for indicating a part of a subject by designating at least one of said sectors by moving said cursor signal in response to user control; and
    storing a magnified signal by reproducing a video signal of said part of said subject by magnifying said part at a rate and recording said video signal on a video tape.

2. The method according to claim 1, wherein said cursor signal generating process comprises:
    determining if a cursor key is pressed;
    generating a cursor clock when said cursor key is pressed; and
    determining if the cursor is coincident with said part to be magnified.

3. The method according to claim 1, wherein said magnifying signal storing process comprises:
    determining if a magnifying scale key is pressed when said cursor signal is coincident with the part of the subject to be magnified;
    connecting switch means to a first contact point when said magnifying scale key is pressed;
    generating a magnifying clock signal; and
    recording the generated magnifying clock signal on said video tape.

4. An apparatus for magnification of a part of a subject, comprising: picture pick-up means for converting incident rays entering a lens into electrical signals, matrix means for generating a bright signal and a color difference signal from the electrical signals, encoder means for modulating said bright signal and said color difference signal to generate modulated signals, video signal processor means for processing and providing said modulated signals to a view-finder and picture recording means, and a lens operating means focussing the lens to a focal point, an improvement comprising:
    division signal generating means for generating a division signal to divide an image plane of the view-finder into a plurality of sectors in response to a first control signal;
    cursor signal generating means for generating a cursor signal for tracking the part of the subject according to a second control signal;
    mixing means for mixing said division signal with said cursor signal and a video signal;
    magnifying clock generating means for providing a clock signal to said picture pick-up means for the purpose of magnifying the part of the subject according to a third control signal when the part of the subject is positioned within said cursor signal;
    switch means for providing the video signal magnified in said video process means to the view-finder and to said recording means according to a fourth control signal when the magnifying clock signal is received;
    magnified signal storage means for converting the magnified signal into a digital signal and storing the digital signal in memory in order to allow reproduction; and
    microcomputer means for generating the first control through the fourth control signal.

5. The apparatus according to claim 4, wherein said division signal generating means comprises:
    a division clock generator for generating a division output signal in response to the first control signal;
    an address signal generator for generating an address signal to divide the view-finder in response to said division output signal; and
    a division signal generator for providing a division signal to divide said view-finder in response to said address signal.

6. The apparatus according to claim 4, wherein said cursor signal generating means comprises:
    a cursor clock generator for generating a cursor clock in response to said second control signal;
    a cursor address generator for generating an address signal to apply a cursor to said cursor clock; and
    a cursor signal generator for providing a cursor signal to a mixer for tracking the part of the subject in response to said address signal.

7. The apparatus according to claim 4, wherein said magnifying clock generating means controls said image pick-up device to generate a clock signal according to a predetermined magnifying scale so as to magnify the part of the subject.

8. The apparatus according to claim 4, wherein said magnified signal storage means comprises:
    an analog to digital converter for converting the video signal magnified into a digital signal to output;
    a memory device for storing the digital signal to generate a stored signal; and
    a digital to analog converter, for converting the stored signal to an analog signal for reproduction.

9. A method for magnification of a video image displayed on a video monitor in a video system, said method comprising:
    performing normal picture recording when a picture recording key is pressed;
    generating division signals for vertically and horizontally dividing said video image displayed on said video monitor into sectors having a grid pattern in response to selection of a division key;
    generating a view-finder division clock when said division key is pressed;
    generating a cursor signal displayed on said video monitor for designating individual ones of said sectors in response to user control; and
    magnifying a portion of said video image corresponding to the designated said individual ones of said sectors in response to a magnification command to generate a magnified video image.

10. The method according to claim 9, wherein said individual ones of said sectors are designated by controlling said video system to move said cursor signal to coincide with said individual sectors.

11. The method according to claim 9, further comprised of storing said magnified video image in a digital format for reproduction.

12. An apparatus for magnification of a portion of a video image, comprising:
   picture pick-up means for converting incident rays entering a lens into electrical signals;
   matrix means for generating brightness signals and color difference signals from said electrical signals,
   encoder means for modulating said brightness signals and said color difference signals to generate modulated signals;
   video signal processor means for processing and providing said modulated signals;
   video monitor means for displaying said video image represented by said modulated signals provided by said video signal processor means;
   picture recording means for generating a printed image represented by said modulated signals;
   division signal generating means for generating division signals to divide said video image into sectors in response to a first control signal;
   cursor signal generating means for generating cursor signals to be displayed on said video monitor means for tracking a portion of said video image according to a second control signal;
   mixing means for mixing said division signals, said cursor signals and said modulated signals to generate combined signals;
   magnifying clock generating means for generating magnifying clock signals in response to a second control signal, said magnifying clock signals received by said picture pick-up means and controlling movement and magnification of said picture pick-up means;
   switching means for selectively providing one of said combined signals and said modulated signals to said video monitor means and to said recording means according to a third control signal;
   magnified signal storage means for converting the magnified signal into a digital signal and storing the digital signal in memory for reproduction; and
   microcomputer means for generating the first control signal, said second control signal, and said third control signal.

13. The apparatus according to claim 12, wherein said division signal generating means comprises:
   division clock generator means for generating a division output signal in response to said first control signal;
   address signal generator means for generating address signals to divide the video image in response to said division output signal; and
   division signal generator means for providing said division signals to divide said video image in response to said address signals.

14. The apparatus according to claim 12, wherein said cursor signal generating means comprises:
   cursor clock generator means for generating a cursor clock in response to said second control signal;
   cursor address generator means for generating an address signal to apply a cursor to said cursor clock; and
   cursor signal generator means for providing a cursor signal to said mixer means.

15. The apparatus according to claim 12, wherein said magnifying clock generating means controls said image pick-up device to generate a clock signal according to a predetermined magnifying scale so as to magnify said portion of said video image.

16. The apparatus according to claim 12, wherein said magnified signal storage means comprises:
   analog to digital converting means for converting the video signal magnified to a digital signal;
   memory device means for storing the digital signal as a stored signal; and
   digital to analog converting means, for converting the stored signal to an analog signal for reproduction.

17. An apparatus for magnification of a portion of a video image, said apparatus comprising:
   video camera means for generating a video signal representing a video image;
   division signal generating means for generating division signals to divide said video image into a plurality of sectors;
   cursor signal generating means for generating a cursor signal for tracking a portion of said video image;
   mixing means for mixing said division signals, said cursor signal and said video signal to generate a combined signal; and
   magnifying control means for controlling said video camera means, wherein when a magnifying signal is received, said magnifying control means enables said video camera means to magnify a portion of said video image tracked by said cursor signal.

18. The apparatus according to claim 17, further comprising video monitor means for receiving said combined signal to display said video image.

19. The apparatus according to claim 17, further comprising:
   switching means for selectively conducting one of either said combined signal if said apparatus is in a monitor mode and said video signal if said apparatus is in a magnification mode.

20. The apparatus according to claim 19, further comprising:
   filter means for generating a filtered signal by filtering division signals and cursor signals from said combined signals; and
   still reproduction means for generating still pictures, said still reproduction means comprising analog to digital converter means for converting said filtered signal into a digital video signal, storage means for storing frames of said digital video signal, and picture generating means for generating said still pictures from the frames stored by said storage means.

21. The apparatus according to claim 19, wherein said cursor signal tracks a portion of said video image signal in correspondence with at least one of said sectors and thereby designating said at least one of said sectors for magnification.

22. The apparatus according to claim 19, further comprising:
   filter means for filtering division signals and cursor signals from said combined signals to generate a filtered signal; and
   still reproduction means for generating still pictures, said still reproduction means comprising analog to digital converter means for converting said filtered signal into a digital video signal, storage means for storing frames of said digital video signal, and picture generating means for generating said still pictures from the frames stored by said storage means.

23. The apparatus according to claim 19, wherein said cursor signal tracks a portion of said video image signal in correspondence with at least one of said sectors so as to designate said at least one of said sectors for magnification.

24. The apparatus according to claim 17, further comprising still reproduction means for generating still pictures, said still reproduction means comprising:

analog to digital converter means for converting said video signal into a digital video signal;

storage means for storing frames of said digital video signal; and picture generating means for generating still pictures from the frames stored by said storage means.

* * * * *

UNITED STATES PATENT AND TRADEMARK OFFICE
CERTIFICATE OF CORRECTION

PATENT NO. : 5,223,934
DATED : June 29, 1993
INVENTOR(S) : Kuen Pyo Hong

It is certified that error appears in the above-indentified patent and that said Letters Patent is hereby corrected as shown below:

On the Title page, item 75], inventor: change "Kuen P. Hong" to Kuen Pyo Hong --.

Column 1, line 15, after "appear", insert --together--, and delete "therefore".

Column 6, line 37, before "the operator", insert --if--.

Signed and Sealed this

Thirtieth Day of August, 1994

Attest:

BRUCE LEHMAN

*Attesting Officer*         *Commissioner of Patents and Trademarks*